United States Patent Office 3,231,447
Patented Jan. 25, 1966

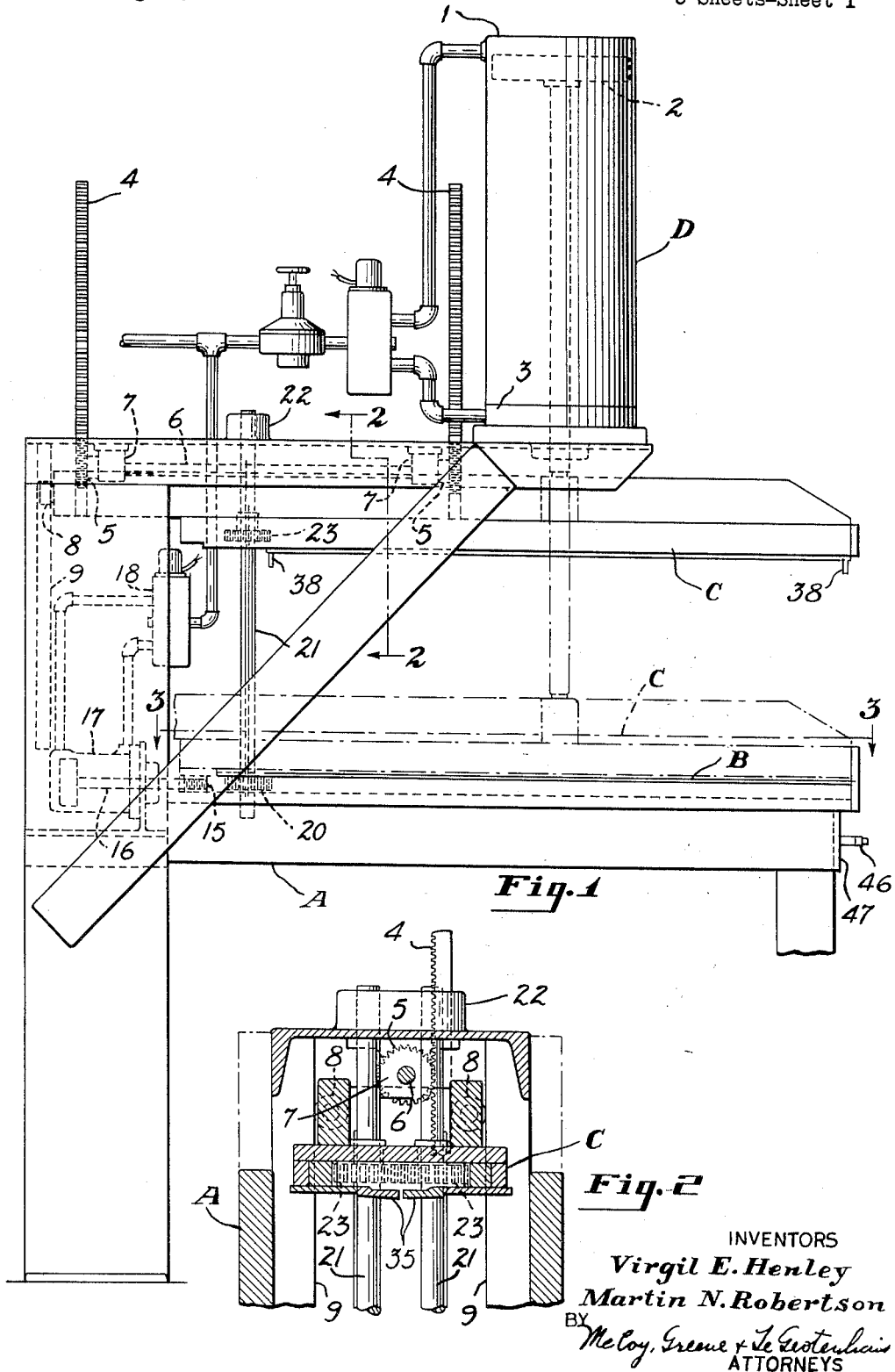

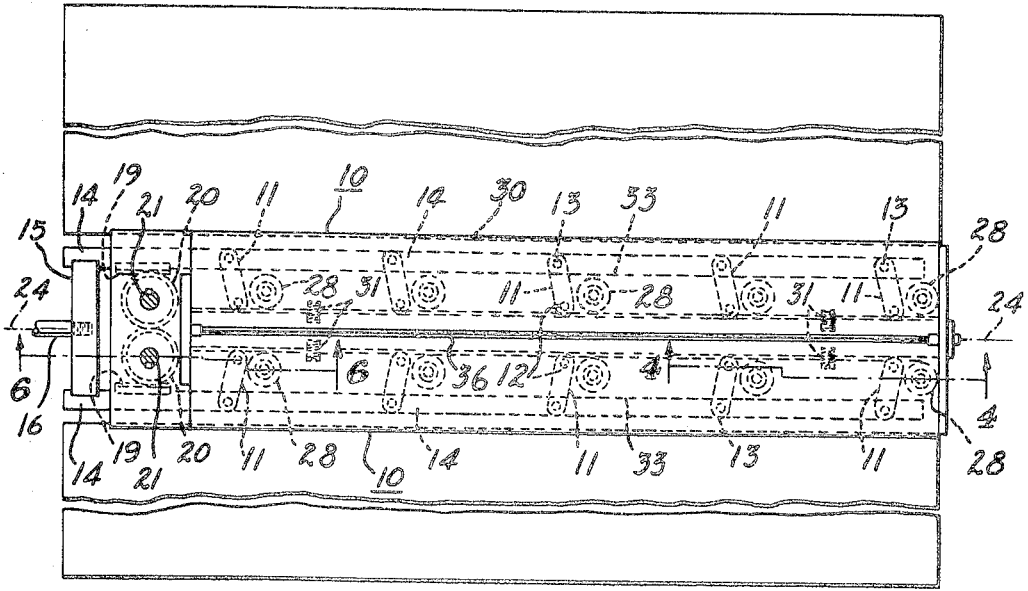
Fig. 3
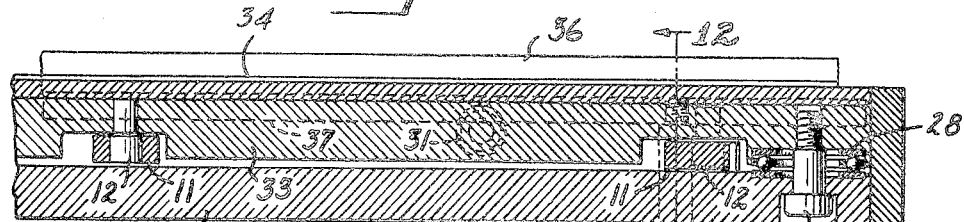
Fig. 4
Fig. 5
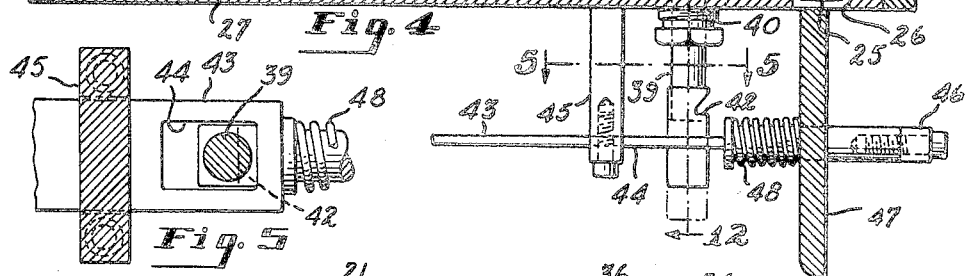
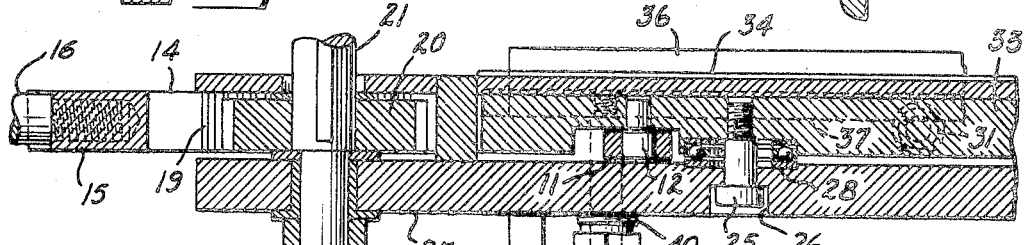
Fig. 6
INVENTORS
Virgil E. Henley
Martin N. Robertson
BY
ATTORNEYS

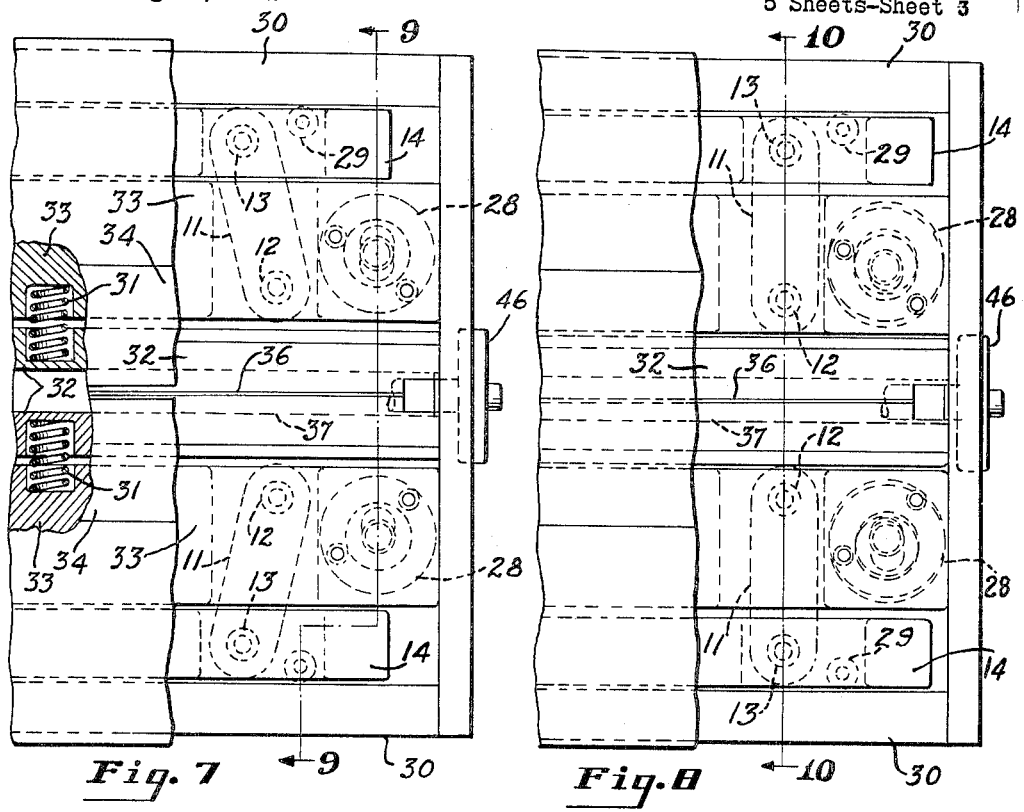
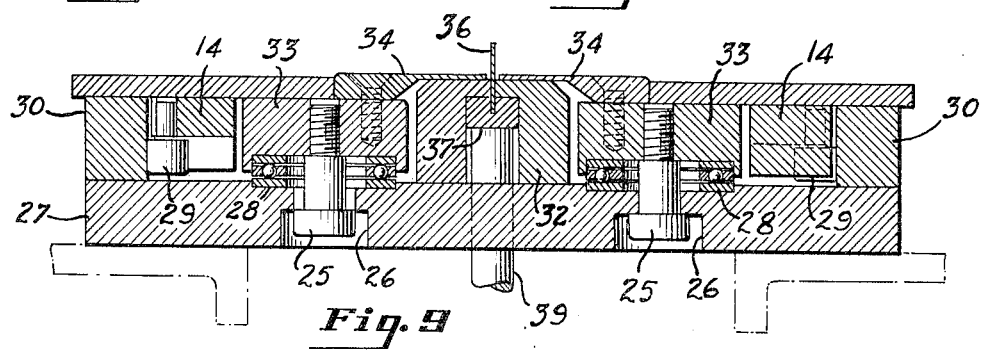
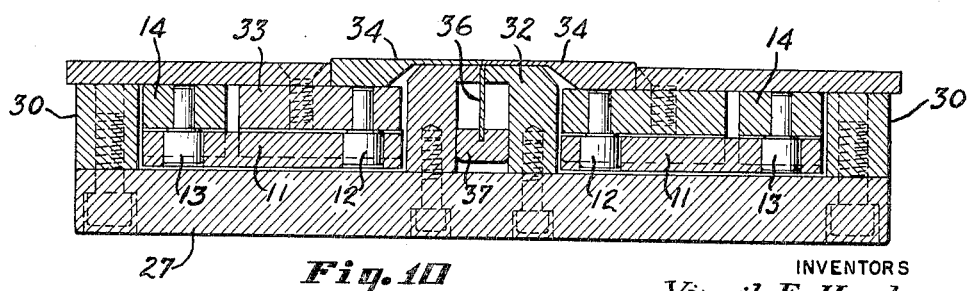

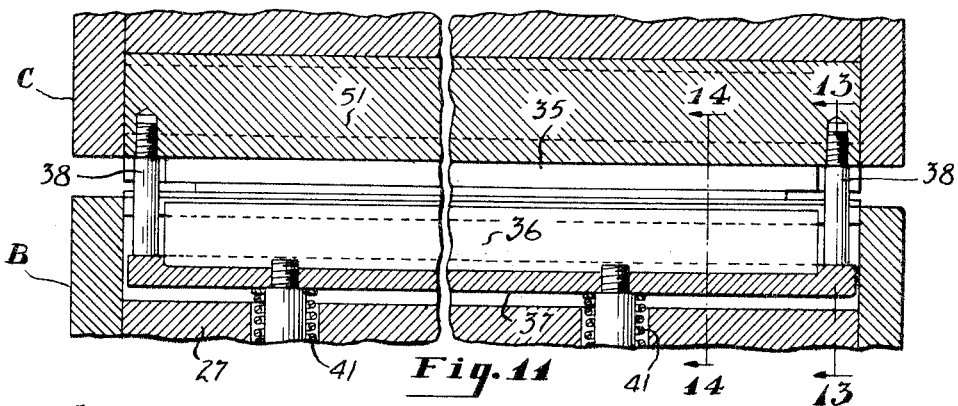
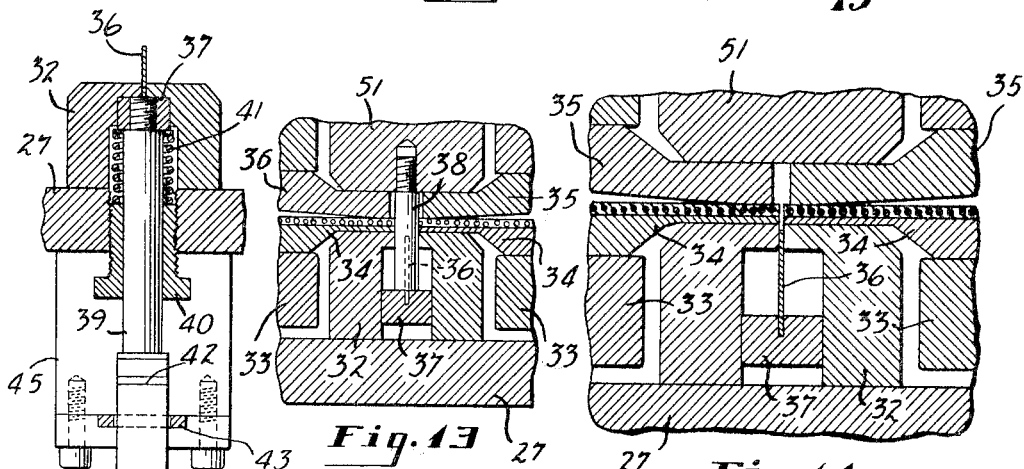
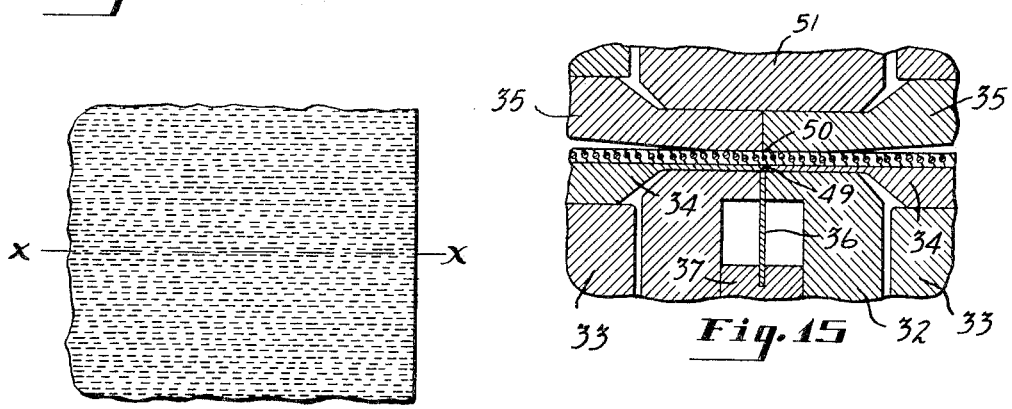

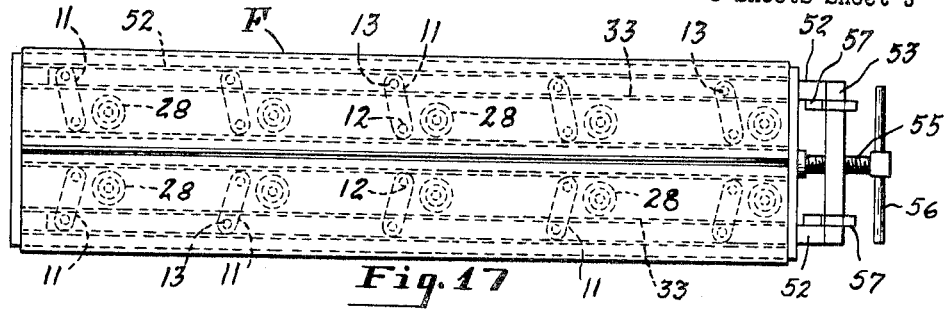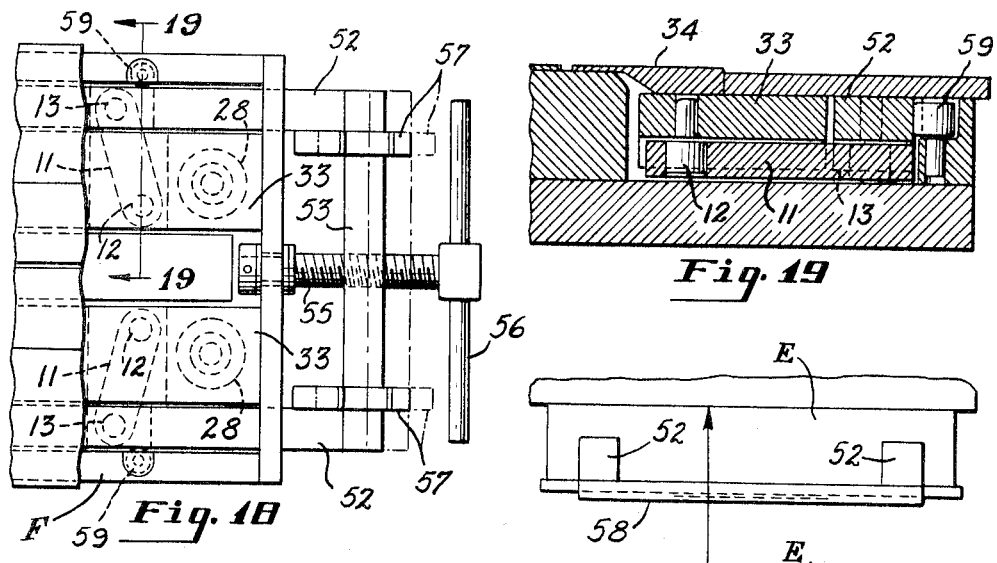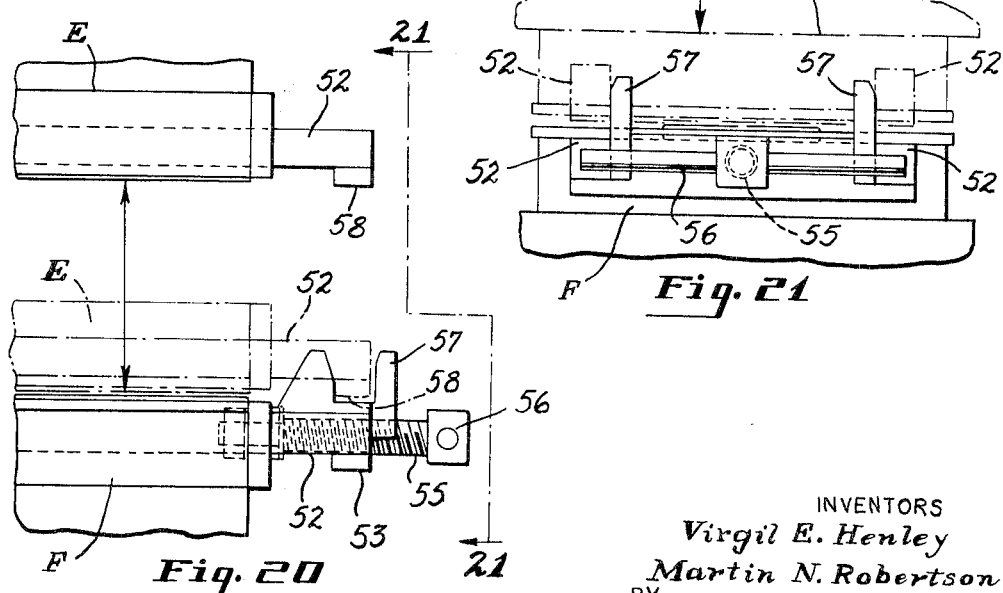

3,231,447
BUTT SPLICER FOR WIRE FABRIC
Virgil E. Henley and Martin N. Robertson, Akron, Ohio, assignors to The General Tire & Rubber Company, Akron, Ohio, a corporation of Ohio
Filed Aug. 6, 1962, Ser. No. 215,103
5 Claims. (Cl. 156—502)

This invention relates to a machine for butt splicing reinforced tire carcass fabric or other sheet material.

The machine of the present invention is designed primarily for butt splicing sheet material such as rubber-coated tire fabric and provides means for tightly gripping the end portions of the material adjacent the line of splice and squeezing the end edges together while tightly gripped with sufficient pressure to integrally join the sheet material along the splice line. It has been found desirable in the manufacture of rubber articles such as tires which are formed of superposed plies in the form of rubber sheets having parallel textile cords or metal wires embedded therein to splice the sheet material edge to edge without overlapping the sheets. By so splicing the sheet material prior to curing, more even cross section in the finished product is provided.

The machine of the present invention is particularly adapted for the butt splicing of wire reinforced ply stock. In the machine herein shown, the wire cords run perpendicular to the length of the ply. Generally, each tire ply is made up of two or more sheets cut along parallel transverse lines from a calendered strip in which closely spaced cords parallel to the longitudinal edges of the strip are embedded. These cut sheets are then spliced along the edges which are parallel to the cords. The resulting ply is then used in the manufacture of tires in which the cords run parallel to the tire axis. It is therefore particularly important to have strong splices since the stretching of the plies when the uncured tire is expanded into a vulcanizing mold subjects the rubber to tensile stresses which could cause separations of the material along splice lines unless a strong union is provided at each splice.

The present machine utilizes an aligning means for accurate positioning of the material and applies high pressures to the abutting ends of the sheet material to insure proper adhesion of the rubber. The completed splice has no appreciable excess of extruded rubber along the line of splice and resists tearing equally as well as unspliced sections of the ply.

It is an object of the present invention to provide a machine for butt splicing the ends of unvulcanized cord reinforced rubber tire carcass material which makes a splice generally as strong as the unspliced portions.

It is a further object of the present invention to provide an accurate means of aligning sheet material edges along a desired line of splice without resort to the visual judgment of the machine operator.

It is a further object of the present invention to provide a machine which makes a splice of uniform strength throughout the thickness and width of the material.

Referring to the drawings,
FIGURE 1 is a side elevation of a machine embodying the invention.
FIGURE 2 is a front sectional view of the same machine taken on the line 2—2 of FIGURE 1 and of the same scale.
FIGURE 3 is a top plan view of the same machine with parts broken away showing the working parts of the lower platen assembly and taken on a line 3—3 of FIGURE 1.
FIGURE 4 is a fragmentary longitudinal sectional view on a larger scale taken on the line 4—4 of FIGURE 3.

FIGURE 5 is a fragmentary top sectional view taken on the line 5—5 of FIGURE 4.
FIGURE 6 is a continuation of the longitudinal sectional view of FIGURE 4 taken on the line 6—6 of FIGURE 3.
FIGURE 7 is a fragmentary top elevation of the same machine with parts broken away and showing the jaws in their outward or open position.
FIGURE 8 is another fragmentary top elevation with parts broken away showing the jaws in their inward or closed position.
FIGURE 9 is a transverse sectional view of the lower platen assembly taken on the line 9—9 of FIGURE 7.
FIGURE 10 is a transverse sectional view of the lower platen assembly taken on the line 10—10 of FIGURE 8.
FIGURE 11 is a fragmentary longitudinal sectional view of the same machine taken on the centerline thereof.
FIGURE 12 is a fragmentary transverse sectional view of the lower platen assembly taken on the line 12—12 of FIGURE 4, showing the positioning blade in its raised position.
FIGURE 13 is a fragmentary transverse sectional view of the same machine taken on the line 13—13 of FIGURE 11.
FIGURE 14 is a fragmentary transverse sectional view of the same machine taken on the line 14—14 of FIGURE 11 and showing on a larger scale the splicing jaws engaging the material prior to their inward movement.
FIGURE 15 is a fragmentary transverse sectional view of the same machine taken on the line 14—14 of FIGURE 11 and showing on a larger scale the splicing jaws engaging the material and pressing the butt ends together.
FIGURE 16 shows a section of material having been spliced by the machine along the line X—X.
FIGURE 17 is a top plan view of the lower platen assembly of a modified form of the machine embodied in the invention.
FIGURE 18 is a fragmentary top elevation of the same machine with parts broken away.
FIGURE 19 is a fragmentary transverse sectional view of the lower platen of the same machine taken on the line 19—19 of FIGURE 18 and of the same scale.
FIGURE 20 is a fragmentary side elevation of the same machine showing the upper platen assembly in both its raised and lowered positions.
FIGURE 21 is a fragmentary end elevation of the same machine showing the upper platen in both its raised and lowered positions corresponding to those shown in FIGURE 20.

Referring more particularly to the drawings, FIGURES 1 through 15 show a machine embodying the invention for butt splicing wire reinforced tire carcass fabric in which the cords run perpendicular to the length of the ply. FIGURE 1 shows a frame A which supports the working parts, a lower platen assembly B which supports the end portions of material to be spliced, a vertically movable upper platen assembly C and a pneumatic air cylinder D. The air cylinder D supports the upper platen assembly C and provides pressure for moving it up and down. When compressed air is forced into the cylinder at the top 1, the piston 2 is forced downward to lower the upper platen assembly to its lower position shown in dashed lines in FIG. 1 where it compressively engages the material to be spliced. When air is forced into the bottom of the cylinder 3, the piston is driven upward to lift the lower platen assembly to its uppermost position.

Longitudinal stability of the upper platen assembly is provided for by longitudinally spaced vertical guide racks 4 which move up and down with the platen assembly. The racks 4 engage spur gears 5 mounted on the same shaft 6. The shaft is mounted in housings 7 in the frame A.

Lateral stability of the upper platen is provided during vertical movement by guide rollers 8 shown in FIGURE 1 and 2, which engage fixed vertical tracks 9 located in the frame.

FIGURE 3 shows the operating mechanism of the lower platen assembly B. The operating mechanism of the upper platen assembly is substantially identical to that of the lower platen assembly and is not shown in detail. The assembly B includes two relatively movable splicing jaws 10 which have opposed longitudinal edges adapted to engage. As herein shown, each jaw is mounted to move toward and away from the other. The jaws 10 are moved by a series of toggle links 11 connected to the jaws by pivot pins 12 at equally spaced points along the length thereof. The opposite end of each link is connected by a pivot pin 13 to a movable push bar 14 which moves in a direction parallel to the jaws. There are four such push bars 14 two of which are part of the lower platen assembly and two of which are part of the upper platen assembly.

The push bars 14 in the lower platen assembly are locked together for simultaneous longitudinal movement by a cross bar 15. A piston 16 extending from an air cylinder 17 is attached to the cross bar 15 for activating the push bars 14 to move the jaws 10. Movement of the piston 16 is controlled by a solenoid activated valve 18 which controls the entry of compressed air into the cylinder 17. The solenoid operating the valve 18 may be controlled manually but is preferably automatically controlled through a suitable timer (not shown) that may be energized by the upper platen as it approaches its lowermost position to actuate the two pairs of jaws after the full gripping pressure is applied to the sheet material.

Each push bar 14 in the lower platen assembly has a rack 19 attached thereto and movable therewith and each of these racks engages a spur gear 20 on a vertical splined shaft 21 as shown in FIGURES 1, 2 and 3. Both of the splined shafts 21 extend vertically upward through the upper platen assembly C and each shaft 21 is rotatably mounted in a bearing 22 in the upper frame. A second spur gear 23 is keyed on each shaft 21 and is slaved to move up and down with the upper platen assembly. Each of these upper platen spur gears 23 engages a rack on an upper platen push bar 14. This gearing means locks the jaw movement of the upper platen assembly to the jaw movement of the lower platen assembly and provides for a coordinated synchronized movement thereof.

FIGURES 7 and 8 show the operation of the jaws in the lower platen assembly in greater detail. FIGURE 7 shows the jaws 10 in their outward or open position leaving a gap along a center-line 24. The position of the jaws at this point in the cycle may be adjusted for variations in material gage.

The movement of the jaws is guided by guide pins 25 in each jaw which move in slots 26 in the lower platen assembly base plate 27. The jaws are supported on antifriction thrust bearings 28 carried by the base plate 27. The thrust bearings may be of any standard variety, the bearings 28 herein shown having ball bearings held in circular tracks. The guide pins 25 extend downwardly from the jaws 10 through the center of the thrust bearings 28 and into slots 26 of the base plate 27.

As the push bars 14 are moved toward the front of the platen assembly, the links 11 move from a diagonal position in relation to the push bars to a position perpendicular thereto as shown in FIGURE 8. The movement of the links 11 moves the jaws 10 toward a centerline 24 where they may come into contact. The mechanical advantage provided by the link assembly increases as the link approaches the perpendicular position. The total distance moved by the push bars is quite small. In the machine illustrated herein, the push bars have a movement of ¾″ while the total movement of each jaw is ³⁄₃₂″. It is desirable that the movement of the individual jaws be slight in order to provide an advantageous multiplication of thrust throughout the pressure applying operation.

Movement of the push bars 14 is facilitated by anti-friction bearings such as rollers 29 carried by the push bars. The rollers 29 bear against side plates 30 of the platen assemblies. Movement of the jaws to their separated position is aided by springs 31 which bear against a center bar 32 attached to the base plate 27 and parallel to the jaws 10 and against jaw mounting bars 33, one forming part of each jaw 10 as shown in section in FIGURES 9 and 10. The springs 31 are located at intervals along the jaws and provide for free and uniform movement.

The splicing cycle is begun by aligning the end edges of the sheet material to be spliced along the longitudinal centerline 24 of the lower platen assembly B with the upper surface of each lower jaw pressure plate 34 engaging the bottom surface of one end portion of the sheet material. The upper platen assembly C is then lowered to a position wherein the lower surface of each upper jaw pressure plate 35 engages the top surface of one end portion of the sheet material. The jaws in the upper platen assembly C are mounted in a manner substantially identical to that of the jaws in the lower platen assembly to provide two pairs of vertically opposed jaws for gripping each end portion of the sheet material. The gripping pressure is sufficient to prevent slipping of the sheet material relative to the jaws. The sequence of movements of the machine is timed to provide firm engagement of the sheet material by the gripping jaws before the gripping jaws are moved together. With the end portions of the sheet material tightly gripped, the gripping pairs of jaws are moved toward each other to press the end edges of the material together with sufficient force to make a splice. The upper platen assembly C is then raised while its jaws are still in their innermost position and the spliced material removed from the machine.

Positioning of the material for splicing may be facilitated by a thin depressable aligning blade 36 which in its elevated position extends above the upper surface of the lower platen assembly B between and parallel to the opposed edges of the lower gripping jaw. The blade 36 provides a guide against which the end edges of the pieces of sheet material to be spliced may be positioned.

The blade 36 is carried in a carrier bar 37 located below the jaws. When the blade is depressed, it retracts below the upper surface of the lower platen assembly to permit the jaws to move inward until they meet.

Depression of the blade is accomplished by two pins 38 in the upper platen C positioned to straddle the material to be spliced, which, when the upper platen assembly is lowered, engage the blade carrier bar 37 and depress it to a position below the top surface of the platen as shown in FIGURES 13, 14 and 15. The blade carrier bar 37 has vertical rods 39 attached thereto adjacent its opposite ends and these rods are slidably mounted in threaded bushings 40 that are screwed into vertical threaded openings in the base plate 27.

The blade 36 is biased toward its upper position by means of springs 41 interposed between the blade carrier bar 37 and the bushings 40. By adjusting the bushings in the base plate 27 the tension of the springs 41 may be varied. Below the bushings 40 the rods 39 have transverse notches 42 with which a horizontally movable locking plate 43 may be engaged to lock the carrier bar 37 in its lowered position. The locking plate 43 extends parallel to the carrier bar 37 beneath the base plate 27 and has elongated slots 44 through which the rods 39 extend. The plate 43 is supported and guided for longitudinal movement in brackets 45 suspended from the base plate 27. At one end thereof the locking plate 43 has a T shaped handle 46 which forms an extension thereof and which is slidably mounted in plate 47 which forms the front side of the frame A. A spring 48 presses the plate 43 toward the rear of the frame A and normally holds the front ends of the slots 44 in engagement with the rods 39. When the carrier bar 37 is in its uppermost position, the rods 39 are engaged by the plate 43 below the notches 42; and when the bar 37 is depressed, the plate 43 is moved into locking engagement with the notches 42 to hold the carrier bar 37 and in a position where the blade 36 is below and clear of the opposed edge portions of the jaws 10. By pulling on the handle 46, the rods 39 may be released to permit the carrier bar 37 and positioning blade 36 to be raised by the springs 41.

The locking means retains the positioning blade in its lowered position after the upper platen C is raised and permits spliced material to be removed from the machine without interference from the blade. After removal of the spliced material, the blade may be manually released and moved by the springs 41 to its uppermost position prior to the next splicing operation.

FIGURES 11, 14 and 15 show the upper platen assembly C in its lowermost position where the pins 38 have depressed the blade 36 and the jaw pressure plates 34 and 35 are in gripping engagement with the end portions of the pieces of sheet material.

FIGURE 14 shows the jaw pressure plates in gripping engagement with the pieces of sheet material prior to the inward movement of the jaws. The end portions of the pieces of sheet material extend slightly inward past the edges of the jaw pressure plates 34 and 35. The gripping jaws when moved inwardly cause pressure to be exerted against the edges of the sheet material to integrally join said edges. During the inward movement of the pairs of gripping jaws, the upper platen jaw pressure plates 35 press downward against the material with sufficient force to prevent slippage of the sheet material due to endwise pressure. The pressure maintained on the sheet material by the pressure plates 35 is at least 25 p.s.i. for wire cord fabric. The gripping surfaces of the upper platen jaw face plates 35 may be slightly slanted downward toward the centerline 24 as shown in FIGURE 13 to provide higher pressure near the splice line and to allow for some springing of the jaws when full pressure is applied.

FIGURE 15 shows the parts at the completion of the splicing movement. The edges of the jaw pressure plates meet along the centerline, and the edges of the material are forcefully pressed against each other. The rubber is extruded slightly into slots 49 and 50 formed by the beveled edges of the jaw pressure plates. It is preferable that the application of vertical pressure be controlled to reach a maximum amount after the jaws have been brought together.

The rigid center bar 32 in the lower platen assembly comprises two identical parts on either side of the centerline 24 which engages the bottom faces of the lower jaw pressure plates 34 to prevent springing of these plates. An upper platen center bar 51 receives the thrust of the piston 1 and applies pressure to the upper platen jaw pressure plates 35.

FIGURE 16 shows a portion of the sheet material which has been spliced along the line X—X.

FIGURES 17–20 show a modified form of a machine embodying the invention differing mainly in the means used to activate the push bars 52 and for synchronizing the movement thereof. In FIGURES 17–21, parts which are identical with parts previously described are designated by the same reference numerals. In this modification, the pairs of gripping jaws are activated to press the edges of the sheet material together by means of a manually operated mechanism. The lower platen push bars 52 are locked together by a cross bar 53 which has a threaded hole 54 in its center as shown. A screw 55 with a T handle 56 is rotatably mounted on the lower platen assembly E as shown and engages the threads in the hole 54. When the screw 55 is turned counterclockwise, the lower platen push bars 52 are moved toward the front of the machine to operate the jaws in the manner previously described.

The lower platen push bars have a member 57 slotted to provide a transverse channel which receives a cross bar 58 connecting the upper platen push bars 52 when the upper platen assembly is lowered to engage the material. When the upper platen assembly is lowered to engage the sheet material, the cross bar 58 of the upper platen push bars 52 is locked to the member 57 connecting the lower platen push bars 52 to provide synchronized movement of all the jaws.

Another distinguishing feature of this embodiment of the invention is the location of the roller bearings 59 for receiving side thrust from the push bars 52. Here the rollers 59 are mounted in the side plates 60 of the platen assemblies E and F as shown in FIGURES 18 and 19.

It has been found preferable to provide the jaw pressure plates in the above described machines with a slight convex longitudinal bow, for example, to provide a low of .025 inch in a length of 40 inches. This compensates for flexing which may occur in the upper platen when full vertical pressure is applied.

The rollers which bear side thrust from the push bars are preferably located near the pivot pins on the push bars to which the links are attached. This provides for more direct transmission of side thrust to the platen assembly side plates.

It is preferable that a high vertical pressure be applied to the end portions of the material which are gripped by the jaws. Wire cord fabric does not permit much extrusion and, therefore, high pressing forces will not normally cause substantial thinning of the material. It is essential that the vertical pressure provide a frictional resistance to slippage between the jaws and the sheet material which will exceed the horizontal force against the edges of the rubber during splicing.

It is also preferable that there be a time delay while the jaws are in their inward position for splicing. This permits more extrusion of the rubber and allows the rubber to absorb more of the heat generated by the pressure to provide more intermolecular adhesion.

It will be understood that the above description is by way of illustration rather than limitation and that, in accordance with the provisions of the patent laws, variations and modifications of the specific machines herein shown and described may be made without departing from the spirit of the invention.

Having described our invention, we claim:

1. A machine for butt splicing sheet material comprising a lower platen assembly for sustaining vertical force and for supporting two end portions of sheet material with their end edges parallel and closely spaced for splicing along a transverse splice line, said lower platen assembly having two lower jaws, one on each side of said transverse line and mounted for relative movement one toward or away from the other, an upper platen assembly located above said lower platen assembly and mounted for vertical movement, said upper platen assembly having two upper jaws facing the lower platen assembly to provide with said lower jaws two pairs of jaws for gripping the pieces of sheet material adjacent their closely spaced ends, a depressible spring-loaded blade assembly for positioning two end portions of sheet material for splicing, said assembly including a relatively thin blade vertically positioned along said splice line, said blade protruding above and perpendicular to the surface of said lower platen assembly when in its raised position, means biasing said blade to its raised position, means located in said upper platen assembly for contacting said blade assembly when said upper platen assembly is lowered and for pushing said blade assembly down to a depressed position below the surface of said lower platen, and a releasable locking assembly to hold said blade assembly in its depressed position when said upper platen assembly is raised, means for raising and lowering said upper platen assembly and means for moving the gripping pairs of jaws one toward the other while in gripping engagement with said sheet material to press the end edges of said sheet material together to splice them.

2. A machine for butt splicing sheet material comprising a frame, a lower platen assembly for sustaining vertical force and for supporting two end portions of sheet material with their end edges parallel and closely spaced for splicing along a transverse line between said edges, said lower platen assembly having two movable lower jaws, one on each side of said transverse line and slidably mounted in said lower platen to move inwardly and outwardly toward and away from said transverse line, an upper platen assembly located above said lower platen assembly and mounted for vertical movement, said upper platen assembly having two movable upper jaws facing the lower platen assembly to provide with said lower jaws two pairs of jaws for gripping the pieces of sheet material adjacent their closely spaced ends, a relatively thin blade vertically positioned along said transverse line extending above and perpendicular to the upper surface of said lower platen assembly for positioning two end portions of sheet material with their end edges parallel and closely spaced for splicing along said transverse line, means for depressing said blade below the upper surface of said lower platen and for holding the same in depressed position, means for raising and lowering said upper platen assembly and for causing said jaws to grip the sheet material, and means for moving the gripping pairs of jaws one toward the other while held in gripping engagement with said sheet material to press the end edges of said sheet material together to splice them.

3. A machine as defined in claim 2 wherein the means for depressing said blade below the upper surface of said lower platen assembly comprises rigid projections carried by the upper platen extending below the lower surface of said upper platen assembly at points sufficiently spaced apart to straddle the material to be spliced to contact the blade when the upper platen is lowered and to depress the blade below the upper surface of said lower platen assembly.

4. A machine as defined in claim 2 wherein the means for moving the gripping jaws toward and away from the transverse splice line while in gripping engagement comprises movable push bars, each interconnected by horizontally movable links to one of said jaws, said bars being mounted for longitudinal motion substantially perpendicular to the direction of motion of said jaws and said links being each pivotally connected at one point to a movable push bar and at another point to one of said jaws to move the jaws toward and away from said transverse line when said push bar is moved through its range of longitudinal motion, rollers attached to each push bar which bear against said platen assemblies to transmit horizontal thrust and to facilitate the movement of said push bars, gearing means for moving all of said push bars simultaneously and uniformly to move all of said jaws inwardly and outwardly with a coordinated, synchronized motion, a pneumatic air cylinder to operate said bars, and a control means for said pneumatic air cylinder.

5. A machine as defined in claim 4 wherein the gearing means for moving all of said push bars simultaneously and uniformly comprises a rack on each push bar of said lower platen assembly, a lower spur gear mounted on and rotatable with a vertically positioned splined shaft meshing with each of said racks, an upper spur gear slidably mounted on each of said splined shafts, said upper spur gears being slave mounted for vertical movement on said splined shaft with said upper platen assembly, and being keyed in said splined shaft to rotate with said shaft, a rack on each push bar in said upper platen assembly, each of said racks being mounted for engagement with one of said spur gears mounted to move with said upper platen to move said push bars simultaneously.

References Cited by the Examiner
UNITED STATES PATENTS

| | | | |
|---|---|---|---|
| 3,100,731 | 8/1962 | Brey | 156—502 |
| 3,075,571 | 1/1963 | Wise | 156—502 |

EARL M. BERGERT, *Primary Examiner.*

DOUGLAS J. DRUMMOND, *Examiner.*